May 10, 1955  C. P. PETTIGREW  2,708,022
MAGNETIC CONVEYOR
Filed March 24, 1954  2 Sheets-Sheet 1

INVENTOR:
CHARLES P. PETTIGREW,
BY: Donald G. Dalton
his Attorney.

May 10, 1955  C. P. PETTIGREW  2,708,022
MAGNETIC CONVEYOR
Filed March 24, 1954  2 Sheets-Sheet 2
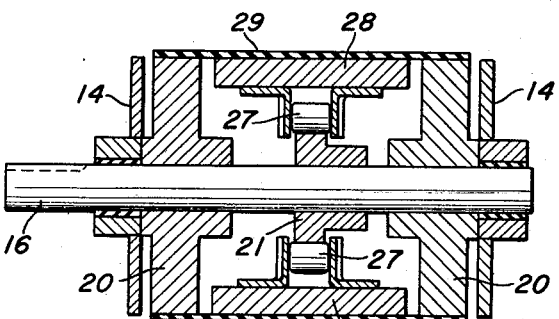
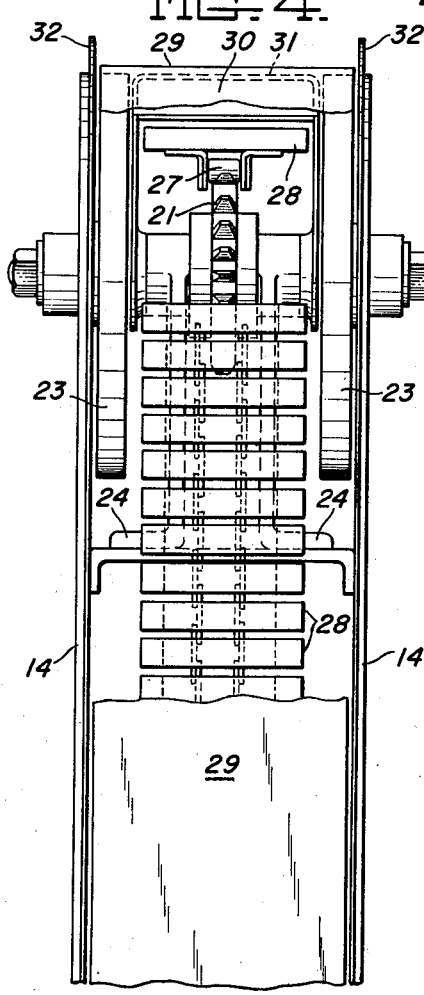
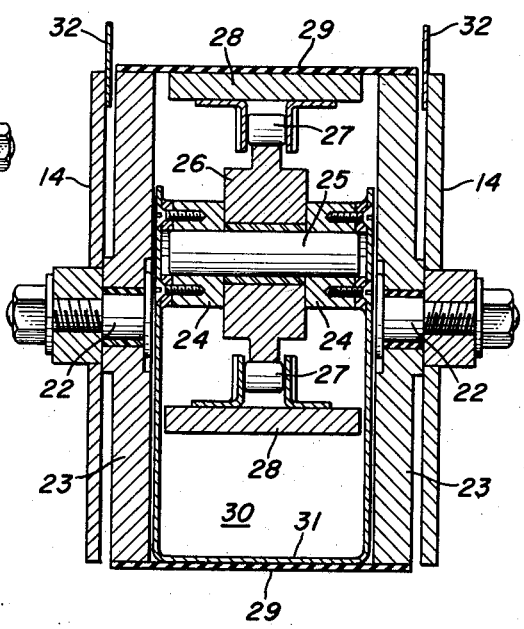
INVENTOR:
CHARLES P. PETTIGREW,
BY: Donald G. Dalton
his Attorney.

United States Patent Office 2,708,022
Patented May 10, 1955

2,708,022

MAGNETIC CONVEYOR

Charles P. Pettigrew, Elwood, Ill., assignor to United States Steel Corporation, a corporation of New Jersey Application March 24, 1954, Serial No. 418,275

4 Claims. (Cl. 198—41)

This invention relates to a magnetic conveyor for transporting small articles, such as nails or staples.

An object of the invention is to provide a magnetic conveyor which embodies permanent magnets and has automatic load releasing means and yet is of simplified construction.

A further object is to provide an improved conveyor of the type which includes an endless magnetic chain and an encircling belt, wherein the chain and belt travel around common rotary elements, thereby eliminating one pulley usual in such conveyors.

A further object is to provide an improved mounting for a pulley and a sprocket which rotate on different axes with the sprocket inside the pulley.

In accomplishing these and other objects of the invention, I have provided improved details of structure, a preferred form of which is shown in the accompanying drawings, in which:

Figure 2 is a sectional view on line II—II of Figure 1;

Figure 3 is a sectional view on line III—III of Figure 1; and

Figure 4 is a plan view of the exit portion of the conveyor with the belt removed.

Figure 1:
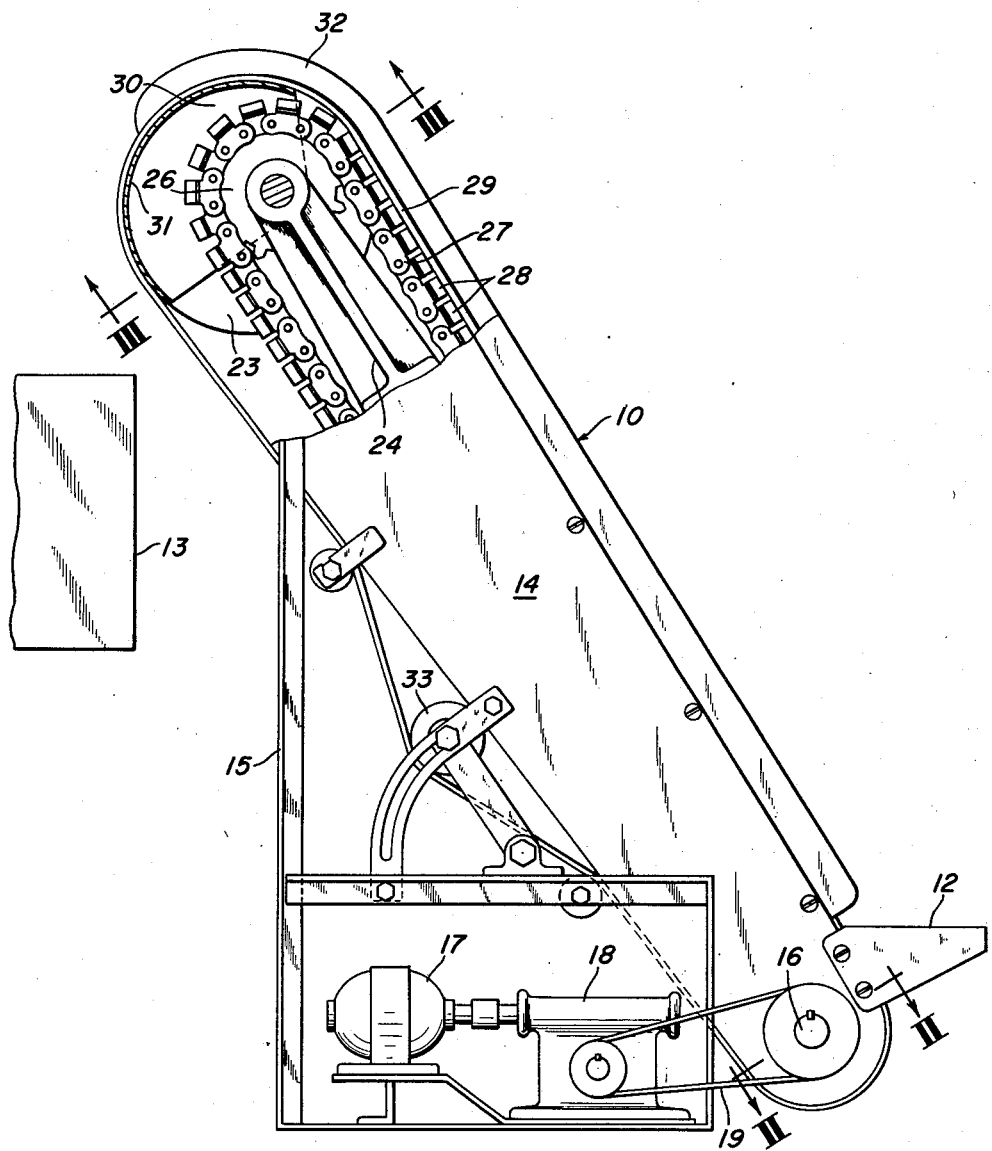
Figure 1 is a side elevational view with parts broken away of a conveyor which embodies features of my invention.

Figure 1 shows a conveyor 10 which is constructed in accordance with my invention and is mounted in an upwardly inclined position to transport small magnetic articles, such as wire nails or staples, from a pan 12 to a buggy 13. In a typical installation the pan 12 can be positioned to receive these articles from a fabricating machine, not shown. The conveyor frame includes a pair of spaced apart side plates 14 which are fixed to a stand 15.

A drive shaft 16 is rotatably mounted in bearings carried by the plates 14 adjacent their lower ends. A drive motor 17 is mounted on the stand 15 and operatively connected to the drive shaft through a speed reducer 18 and belt and pulley means 19. As best shown in Figure 2, the drive shaft 16 carries a pair of spaced apart drive pulley elements 20 and a drive sprocket 21. The pulley elements are located immediately inside the respective side plates 14, and the sprocket is located between the two pulleys elements and is of smaller diameter.

As shown in Figures 1, 3 and 4, the respective side plates 14 carry inwardly extending pivot studs 22 adjacent their upper ends. Spaced apart rotatable idler pulley elements 23 are mounted on these studs and are located immediately inside the respective side plates. The latter pulley elements are of larger diameter than the drive pulley elements 20. A pair of brackets 24 also are mounted on the inside of the respective side plates 14 and extend into the space between the pulley elements 23. A pin 25 extends between the two brackets 24 and carries a rotatable idler sprocket 26 of smaller diameter than the latter pulley elements. The axes of rotation of the idler sprocket and the idler pulley elements do not coincide, but that of the sprocket is somewhat above that of the pulley elements.

An endless chain 27 runs around the sprockets 21 and 26 and carries a plurality of closely spaced permanent magnets 28 along its entire length. An endless belt 29 of rubber or equivalent material runs around the pulley elements 20 and 23 and encircles said chain. The upper portion of the belt between the drive pulley elements 20 and the idler pulley elements 23 constitutes the carrying flight of the conveyor. The entry end is adjacent the drive elements and the exit end adjacent the idler elements. Throughout the carrying flight and also around the drive pulley elements 20, the magnets 28 are closely adjacent the undersurface of thte belt. Thus they serve both to support this portion of the belt and to attract articles thereto. Beyond the idler pulley elements 23 the belt diverges from the chain and magnets, as indicated at 30. Consequently the magnetic attraction diminishes and articles automatically drop off the belt after they pass the idler pulley elements.

Preferably a guide shoe 31 for the belt is fixed to the brackets 24 inside the idler pulley elements 23. This guide shoe has an arcuate surface of radius approximately equal to that of the elements 23. This surface provides a smooth supporting surface for the belt 29 in the region 30 where it diverges from the chain 27. Preferably the side plates 14 carry upstanding guides 32 for the side edges of the belt, and the stand 15 carries an adjustable belt tightener pulley 33. The latter pulley is located adjacent the underside of the conveyor and the belt extends therearound as shown in Figure 1.

In operation, the chain 27 and belt 29 are driven together in a counterclockwise direction through the drive motor 17, speed reducer 18, belt and pulley means 19, and drive shaft 16. The magnets 28 attract articles within the pan 12 to the outer surface of the belt 29. Magnetic attraction holds the articles on the belt throughout the carrying flight thereof. Beyond the idler pulley elements 23, the distance between the belt surface and the magnets 28 becomes greater. Consequently after the articles pass this point, the magnetic attraction is no longer sufficient to hold them on the belt, and they drop into the buggy 13. The guide shoe 31 also may have a shielding effect and act further to diminish the magnetic attraction beyond the idler pulley elements.

From the foregoing description it is seen that my invention provides a magnetic conveyor which automatically releases its load, and yet is of exceedingly simple construction. It embodies only two sets of pulley elements for its belt and two sprockets for its chain, thereby eliminating one set of pulley elements usual in such conveyors. The bracket arrangement at the exit end affords a highly efficient means for mounting one rotatable element within another where the axes of rotation do not coincide.

While I have shown and described only a single embodiment of the invention, it is apparent that modifications may arise. Therefore, I do not wish to be limited to the disclosure set forth but only by the scope of the appended claims.

I claim:

1. A magnetic conveyor comprising a frame, a pair of spaced apart drive pulley elements and a drive sprocket therebetween rotatably mounted on said frame adjacent one end thereof, a pair of spaced apart idler pulley elements and an idler sprocket therebetween rotatably mounted in said frame adjacent the other end thereof, an endless chain running around said sprockets, a plurality of magnets carried by said chain, and an endless belt running around said pulley elements and encircling said chain and magnets and having a carrying flight whose entry end is adjacent said drive pulley elements and whose exit end is adjacent said idler pulley elements, said idler sprocket being of smaller diameter than said idler pulley elements and rotatable on an axis closer to the carrying flight of the belt, said magnets being closely adjacent the belt along the carrying flight thereof to attract articles but diverging therefrom beyond said idler pulley elements to discharge the articles automatically.

2. A magnetic conveyor comprising a frame, a drive shaft rotatably mounted in said frame adjacent one end, a pair of spaced apart drive pulley elements and a drive sprocket therebetween mounted on said drive shaft, a pair of spaced apart idler pulley elements rotatably mounted on said frame adjacent the other end thereof, brackets fixed to said frame and extending into the space between said idler pulley elements, an idler sprocket rotatably mounted on said brackets between said idler pulley elements, an endless chain running around said sprockets, a plurality of magnets carried by said chain, and an endless belt running around said pulley elements and encircling said chain and having a carrying flight whose entry end is adjacent said drive pulley elements and whose exit end is adjacent said idler pulley elements, said idler sprocket being of smaller diameter than said idler pulley elements and rotatable on an axis closer to the carrying flight of the belt, said magnets being closely adjacent the belt along the carrying flight thereof to attract articles but diverging therefrom beyond said idler pulley elements to discharge the articles automatically.

3. A magnetic conveyor comprising a pair of spaced apart side plates, a drive shaft rotatably mounted in said side plates adjacent one end, a pair of spaced apart drive pulley elements and a drive sprocket therebetween mounted on said drive shaft between said side plates, a pair of spaced apart idler pulley elements rotatably mounted inside the respective side plates adjacent the other end thereof, brackets fixed to the inside faces of the respective side plates and extending into the space between said idler pulley elements, an idler sprocket rotatably mounted on said brackets between said idler pulley elements, an endless chain running around said sprockets, a plurality of magnets carried by said chain, and an endless belt running around said pulley elements and encircling said chain and having a carrying flight whose entry end is adjacent said drive pulley elements and whose exit end is adjacent said idler pulley elements, said idler sprocket being of smaller diameter than said idler pulley elements and rotatable on an axis closer to the carrying flight of the belt, said magnet being closely adjacent the belt along the carrying flight thereof to attract articles but diverging therefrom beyond said idler pulley elements to discharge the articles automatically.

4. A conveyor as defined in claim 3 in which said chain and said magnets furnish support for the belt between said sprockets along the carrying flight, and including a guide shoe fixed to said brackets between said idler pulley elements to furnish support for the belt beyond said idler sprocket.

References Cited in the file of this patent

UNITED STATES PATENTS

| 373,211 | Wenstrom | Nov. 15, 1887 |

FOREIGN PATENTS

| 575,309 | Germany | Apr. 27, 1933 |